(12) United States Patent
Sakamoto et al.

(10) Patent No.: US 11,281,465 B2
(45) Date of Patent: Mar. 22, 2022

(54) NON-TRANSITORY COMPUTER READABLE RECORDING MEDIUM, COMPUTER CONTROL METHOD AND COMPUTER DEVICE FOR FACILITATING MULTILINGUALIZATION WITHOUT CHANGING EXISTING PROGRAM DATA

(71) Applicant: GREE, Inc., Tokyo (JP)

(72) Inventors: Wataru Sakamoto, Tokyo (JP); Ryosuke Nishida, Tokyo (JP)

(73) Assignee: GREE, Inc., Tokyo (JP)

( * ) Notice: Subject to any disclaimer, the term of this patent is extended or adjusted under 35 U.S.C. 154(b) by 158 days.

(21) Appl. No.: 16/382,670

(22) Filed: Apr. 12, 2019

(65) Prior Publication Data
US 2019/0317763 A1  Oct. 17, 2019

(30) Foreign Application Priority Data
Apr. 13, 2018 (JP) .............................. JP2018-077596

(51) Int. Cl.
*G06F 9/30* (2018.01)
*A63F 13/69* (2014.01)
*G06F 40/47* (2020.01)

(52) U.S. Cl.
CPC ............ *G06F 9/3004* (2013.01); *A63F 13/69* (2014.09); *G06F 40/47* (2020.01)

(58) Field of Classification Search
CPC ........ G06F 9/3004; G06F 40/40; G06F 40/42; G06F 40/47; G06F 40/55; A63F 13/69
See application file for complete search history.

(56) References Cited

U.S. PATENT DOCUMENTS 5,175,684 A * 12/1992 Chong .................. G06F 40/268
704/3
5,477,451 A * 12/1995 Brown .................... G06F 40/55
704/9
(Continued)

FOREIGN PATENT DOCUMENTS

JP  2004097283 A  4/2004
JP  2008220585 A  9/2008
(Continued)

OTHER PUBLICATIONS

Japanese Office Action dated Jun. 9, 2020, in connection with corresponding JP Application No. 2018-077596 (8 pp., including machine-generated English translation).

*Primary Examiner* — Eric Yen
(74) *Attorney, Agent, or Firm* — Maier & Maier, PLLC

(57) ABSTRACT

A non-transitory computer readable recording medium has stored thereon instructions to be executed on a computer providing terminal device with a game. The recording medium includes, for example, a main program described with Japanese text data, and language data in which English text data is associated with identification information (hash value). The instructions cause the computer to perform the steps of: setting a language to be displayed on a display section; generating a retrieval key by performing data processing on the first data to be displayed that is included in the main program when the second language is set as a language to be displayed; and extracting the second data to be displayed that includes the identification information corresponding to the generated key, and replacing the first data to be displayed with the second data to be displayed to display the second data to be displayed on the display section.

20 Claims, 8 Drawing Sheets

(56) References Cited

U.S. PATENT DOCUMENTS

| | | | | |
|---|---|---|---|---|
| 5,724,593 A * | 3/1998 | Hargrave, III | | G06F 40/45 704/7 |
| 6,233,544 B1 * | 5/2001 | Alshawi | | G06F 40/44 704/2 |
| 6,615,300 B1 * | 9/2003 | Banning | | G06F 9/30061 710/100 |
| 8,312,390 B2 * | 11/2012 | Fitzpatrick | | G06F 3/0481 715/856 |
| 8,738,357 B2 * | 5/2014 | Och | | G06F 40/49 704/2 |
| 9,128,579 B2 * | 9/2015 | Tandra Sishtla | | G06F 3/048 |
| 9,857,960 B1 * | 1/2018 | Dennis | | H04L 67/10 |
| 9,881,002 B1 * | 1/2018 | Qureshi | | G06F 40/40 |
| 9,916,305 B1 * | 3/2018 | Ayan | | H04L 51/063 |
| 10,749,818 B1 * | 8/2020 | Bikumala | | H04L 51/20 |
| 2001/0032070 A1 * | 10/2001 | Teicher | | G06K 9/2054 704/2 |
| 2003/0115552 A1 * | 6/2003 | Jahnke | | G06F 40/40 715/201 |
| 2004/0119714 A1 * | 6/2004 | Everett | | G06F 40/109 345/471 |
| 2004/0157655 A1 | 8/2004 | Tsugiiwa | | |
| 2005/0168642 A1 * | 8/2005 | Sakamoto | | G06F 40/109 348/569 |
| 2006/0271352 A1 * | 11/2006 | Nikitin | | G06F 40/58 704/9 |
| 2008/0040095 A1 * | 2/2008 | Sinha | | G06F 40/45 704/2 |
| 2009/0106016 A1 * | 4/2009 | Athsani | | G06F 40/58 704/3 |
| 2009/0125477 A1 * | 5/2009 | Lu | | G06F 16/3343 |
| 2009/0271175 A1 * | 10/2009 | Bodin | | G10L 13/00 704/2 |
| 2010/0318743 A1 * | 12/2010 | Fitzpatrick | | G06F 9/454 711/126 |
| 2011/0252316 A1 * | 10/2011 | Pahud | | G06F 40/58 715/264 |
| 2012/0066180 A1 * | 3/2012 | Greene | | G06F 16/119 707/635 |
| 2012/0253785 A1 * | 10/2012 | Hamid | | G06F 40/58 704/4 |
| 2013/0007598 A1 * | 1/2013 | Draper | | G06F 40/154 715/235 |
| 2013/0042108 A1 * | 2/2013 | Cancedda | | G06F 21/602 713/168 |
| 2013/0144595 A1 * | 6/2013 | Lord | | G06F 40/58 704/2 |
| 2013/0179150 A1 * | 7/2013 | Eriksson | | G06F 40/10 704/9 |
| 2013/0282360 A1 * | 10/2013 | Shimota | | G06F 40/58 704/7 |
| 2013/0332972 A1 * | 12/2013 | Jacobson | | H04N 21/2393 725/93 |
| 2014/0039872 A1 * | 2/2014 | Patel | | G06F 9/454 704/2 |
| 2014/0063027 A1 * | 3/2014 | Becker | | G06F 9/505 345/520 |
| 2014/0325407 A1 * | 10/2014 | Morris | | G06F 3/0481 715/765 |
| 2015/0039991 A1 * | 2/2015 | Cameron | | G11B 27/034 715/230 |
| 2016/0275057 A1 * | 9/2016 | Dendi | | G06F 40/58 |
| 2016/0357732 A1 * | 12/2016 | Hsu | | G06F 40/42 |
| 2017/0017503 A1 * | 1/2017 | Levy | | G06F 40/58 |
| 2017/0169014 A1 * | 6/2017 | Sotelo | | G06Q 30/06 |
| 2018/0137103 A1 * | 5/2018 | Watson | | G09B 21/006 |
| 2018/0203849 A1 * | 7/2018 | Geib | | G06F 40/58 |

FOREIGN PATENT DOCUMENTS

| | | | | |
|---|---|---|---|---|
| JP | | 2014-225256 A | 12/2014 | |
| WO | WO-2006121849 A2 * | | 11/2006 | G06F 40/51 |

* cited by examiner

FIG. 5

| IDENTIFICATION INFORMATION (HASH VALUE) | JAPANESE TEXT | ENGLISH TEXT |
|---|---|---|
| 3ad8e1c5b0e7ea5a5efee2c30afa449e | いらっしゃい！<br>うちは、品揃えが豊富だよ。<br>この薬なんかどうだい？ | Welcome!<br>We have many goods.<br>How about this medicine? |
| d3dc9065dc09efa3cbe01e55dcfbe55a | この薬は、いくらだい？ | How much the medicine? |
| 23cd70ded7c88e9133d02dae86f1df09 | この薬は、30円だよ。 | This medicine is 30 yen |
| | ... | |

NON-TRANSITORY COMPUTER READABLE RECORDING MEDIUM, COMPUTER CONTROL METHOD AND COMPUTER DEVICE FOR FACILITATING MULTILINGUALIZATION WITHOUT CHANGING EXISTING PROGRAM DATA

CROSS-REFERENCE TO RELATED APPLICATIONS

This application claims the benefit of Japanese Priority Patent Application JP 2018-77596 filed on Apr. 13, 2018, the entire contents of which are incorporated herein by reference.

FIELD

The present invention relates to a Non-transitory computer readable recording medium, computer control method and computer device that can deal with a plurality of languages.

BACKGROUND

In recent years, more and more users install a game program on a portable terminal, such as a cellular phone and a tablet device, to play the game using the portable terminal. Since such a game program for a portable terminal is expected to be used not only in Japan but also in foreign countries, the game program is preferably available in different languages according to a region where the portable terminal is sold or used. To that end, Japanese text data as well as text data translated into each of a plurality of foreign languages corresponding to the Japanese text data are included in the game program, so that a user who plays the game is allowed to select an appropriate foreign language. Consequently, the foreign language can be displayed.

As an example of multilingual game program, Japanese Patent Laid-Open No. 2004-97283 discloses an invention of a game program in which when the game program is instructed to change the setting language, the game is interrupted to display a language selection screen, the language is selected, and then the game is restarted in the changed language. Furthermore, Japanese Patent Laid-Open No. 2008-220585 discloses an invention of a game program in which line data representing characters used in the screen for a game is generated according to the set language, and a line is drawn on the display using this line data to display the game screen.

In the conventional multilingual game program, a plurality of pieces of program data for game progression (for example, a file written in a Lua programming language) are prepared for each available language in advance. When the in-use language is changed, the program data corresponding to the selected language is read, and the game progresses using the changed language.

Therefore, when the contents of the texts to be displayed are changed, it is necessary to make changes in the program data corresponding to all of the languages. The language texts need to be corrected in all of the game programs, imposing a large burden of the correction work because of a large amount of data of the recent game program.

SUMMARY

A non-transitory computer readable recording medium according to the present invention having stored thereon instructions to be executed on a computer for providing a game, the recording medium includes a main program described with a first data to be displayed in a first language, and language data in which a second data to be displayed in a second language is associated with identification information, the second language being different from the first language. The instructions causes the computer having a display section to perform the steps of setting a language to be displayed on the display section; generating a retrieval key by performing data processing on the first data to be displayed that is included in the main program when the second language is set as a language to be displayed; and extracting the second data to be displayed that includes the identification information corresponding to the generated key, and replacing the first data to be displayed with the second data to be displayed to display the second data to be displayed on the display section.

According to the present invention, by use of a main program described with a first data to be displayed in a first language and language data in which a second data to be displayed in a second language different from the first language is associated with identification information, it is possible to facilitate multilingualization without changing existing program data.

BRIEF DESCRIPTION OF DRAWINGS

FIG. 5 is a diagram illustrating the relationship of correspondence between Japanese texts and English texts;

DETAILED DESCRIPTION

Figure 1:
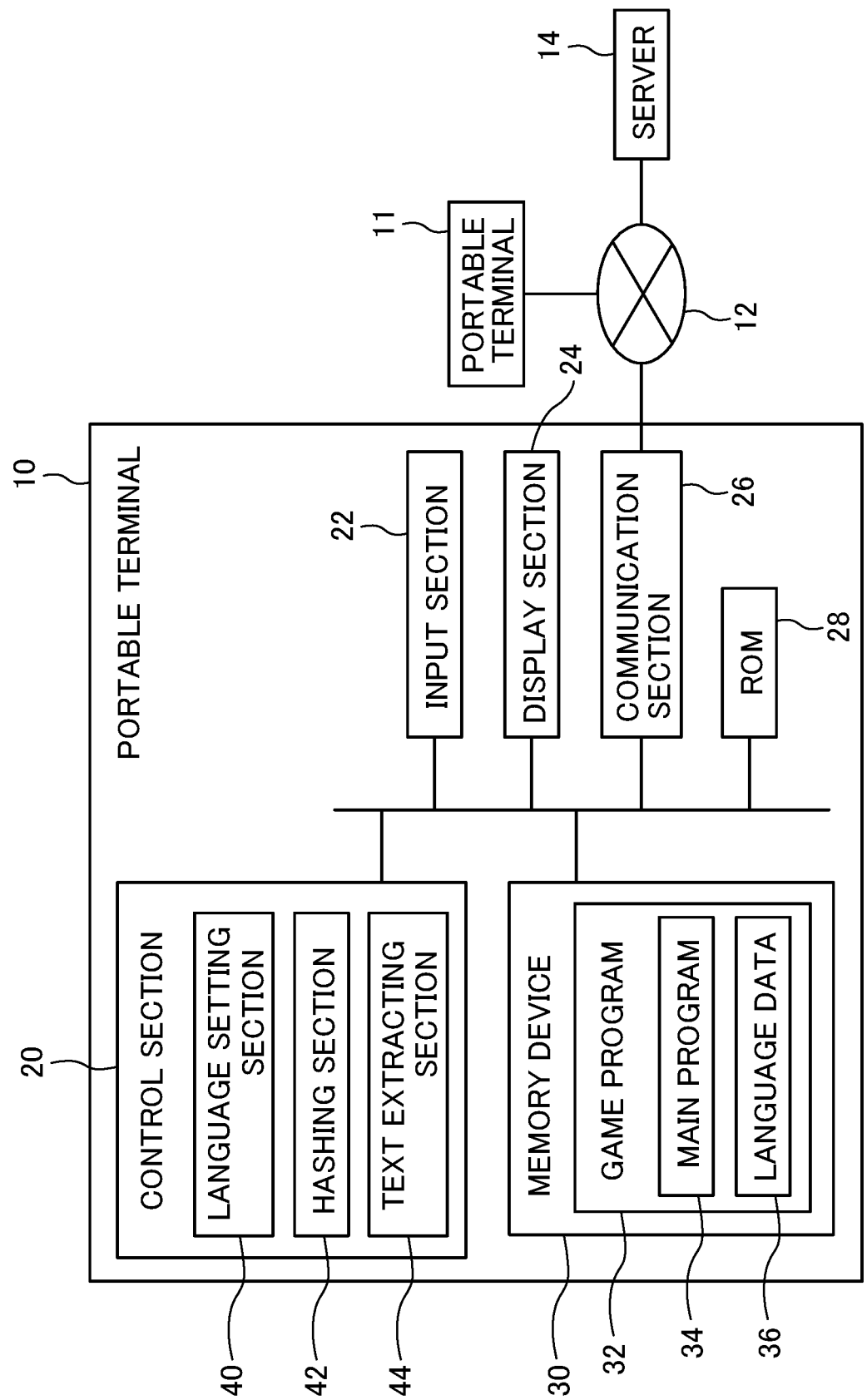
FIG. 1 is a configuration diagram of a system according to one embodiment of the present invention.

The following describes and embodiment of the present invention with reference to the accompanying drawings. Note that identical or corresponding components are denoted by identical reference numerals and will not be described in duplication.

As illustrated in FIG. 1, a portable terminal (for example, a cellular phone, a tablet device, a personal computer, a smartphone, an e-book reader, a wearable computer, a gaming console, a head mounted display, or other various information processing devices) 10 according to the present embodiment is connected to another portable terminal 11 through a communication network 12. The portable terminal 10 is connected to a server 14 providing various contents through the communication network 12, so that game data transmission and reception can be performed between the portable terminal 10 and the server 14. Thus, a user of the portable terminal 10 can play an online game with another user of the portable terminal 11.

In FIG. 1, the portable terminal 10 includes a control section 20, an input section 22, a display section 24, a communication section 26, a ROM 28, and a memory device 30. The control section 20 integrally controls the operation of the portable terminal 10, and executes a system program stored in the ROM 28 to thereby perform various functions of the portable terminal 10. The control section 20 executes a game program 32 stored in the memory device 30 to thereby perform various functions of playing a game of a language setting section 40, a hashing section 42, and a text extracting section 44 described later.

The input section 22 is, for example, a touch-type panel provided on a front surface of the portable terminal 10. When the input section 22 receives various operation inputs from the user, the input section 22 outputs input signals in response to the operation contents. The display section 24 is, for example, a liquid crystal panel or an organic EL panel, and displays various screens such as a game screen described later. The communication section 26 transmits and receives data to and from the other portable terminal 11 and the server 14 through the communication network 12.

The ROM 28 stores various programs and various pieces of setting data for controlling the basic operation (such as making a call) that are read by the control section 20 when the portable terminal 10 is activated.

The memory device 30 stores application programs and various pieces of setting data such as the game program 32, in addition to data such as various programs read from the ROM 208. Note that the data of the game program 32 is stored in the memory device 30 when being downloaded from an external server through the communication section 26, for example. Alternatively, the game program 32 may be preinstalled in the memory device 30.

The game program 32 includes a main program 34 that describes a program for executing a game, and language data 36 that describes the texts to be displayed in foreign languages, and is read as appropriate in accordance with progression of the game. The main program 34 can be created by Lua, for example, but the main program may be created using another programming language.

Figure 2:
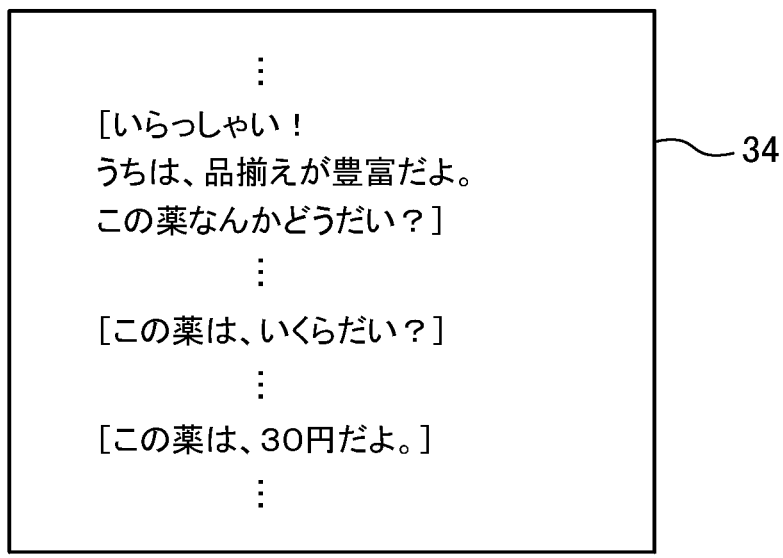
FIG. 2 is a diagram illustrating a main program (Lua file) in which Japanese text is included.

FIG. 2 is a diagram illustrating an example of text data included in the main program 34 (note that in FIG. 2, functions included in the main program 34 are omitted). The main program 34 is provided for each of a plurality of areas included in the game, for example. For example, when a character of the game moves to a certain area, this serves as a trigger to cause the main program 34 to read from the server 14 the main program (Lua file) in accordance with the area of the moved destination of the character, so that the game progresses. Furthermore, in the main program (Lua file) for a certain area, the Lua file related to a story or a quest that is generated and progresses in such an area may be further read thereinto from the server.

The texts displayed in accordance with the progression of the game in the main program 34 are written in Japanese. For example, the main program 34 includes Japanese texts "Irasshai! Uchi wa shinazoroe ga houfudayo. Kono kusuri nanka doudai?" ("Welcome! We have many goods. How about this medicine?"), "Kono kusuri wa ikuradai?" ("How much is this medicine?"), "Kono kusuri wa 30 yen dayo" ("This medicine is 30 yen.")". The control section 20 sequentially reads these texts according to the progression of the game to make the display section 24 sequentially display the texts.

Figure 3:
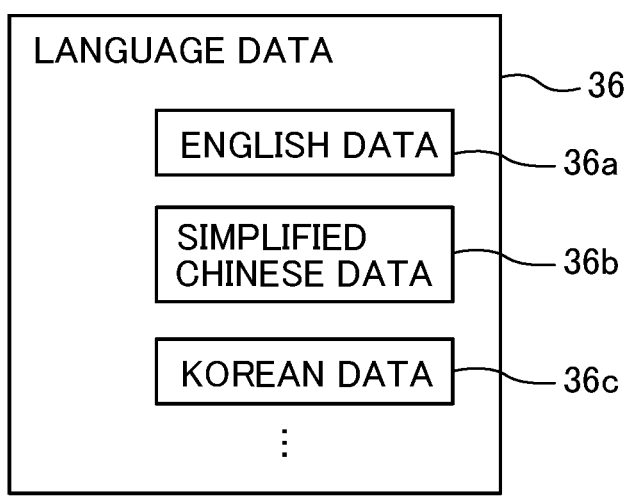
FIG. 3 is a diagram illustrating a configuration of language data.
Figure 4:
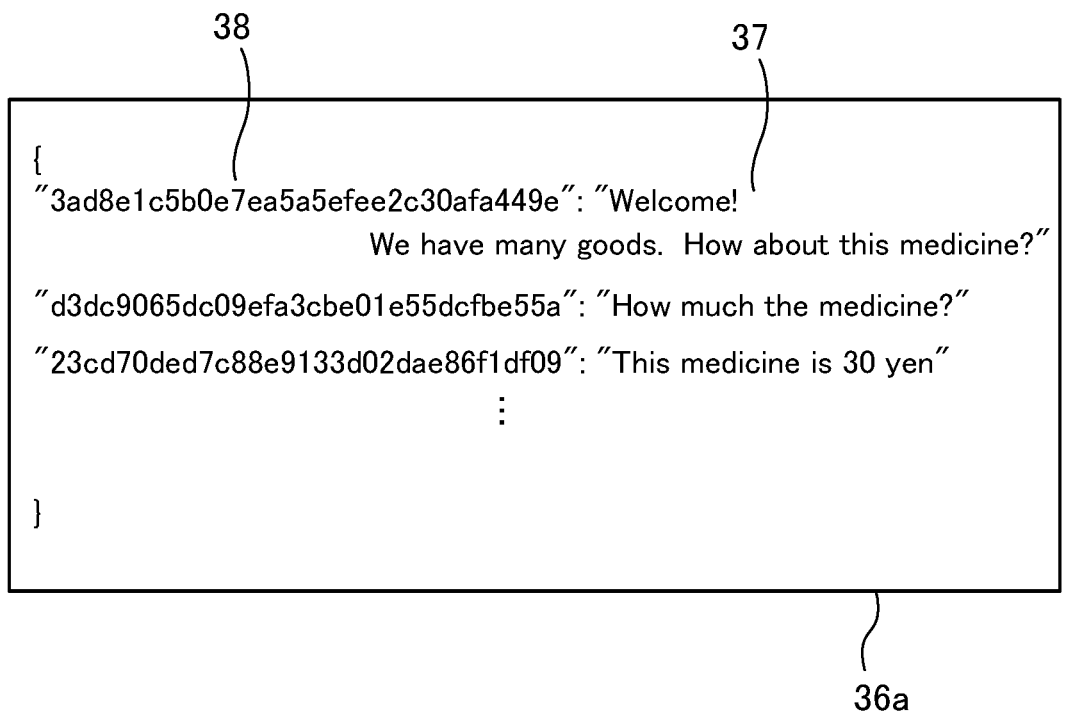
FIG. 4 is a diagram illustrating a configuration of language data (in English)

As illustrated in FIG. 3, the language data 36 includes text data (for example, English data 36a, Simplified Chinese data 36b, and Korean data 36c) prepared for each language, the text data corresponding to the Japanese texts described in the main program 34. FIG. 4 is a diagram illustrating an example of a data configuration of the English data 36a. For example, the English data 36a is serialized to JSON Schema and is recorded so that English texts 37 are associated with corresponding identification information 38.

The serialized language data 36 is stored in the server 14. When another language is set by a player, the serialized language data 36 is configured to receive the language data 36 corresponding to the set language from the server 14. Thereby, the language data 36 corresponding to all of the languages does not have to be installed when the game is installed, and therefore the capacity of the game program 32 initially downloaded can be reduced.

In the example in FIG. 4, the English texts "Welcome! We have many goods. How about this medicine?" are associated with the identification information "3ad8e1c5b0e7ea5a5efee2c30afa449e". This identification information 38 is a hash value obtained by hashing the corresponding Japanese texts (Irasshai! Uchi wa shinazoroe ga houfudayo. Kono kusuri nanka doudai?" ("Welcome! We have many goods. How about this medicine?")) by a hash function such as MD5. Note that in the present embodiment, a case where 32-digit hash value is generated is described as an example, but the number of digits is not limited to 32, and may be an arbitrary number of digits so that the texts of interest can be identified from another texts.

FIG. 5 is a diagram illustrating the relationship of correspondence between the Japanese texts and the English texts. The Japanese texts and the English texts are associated with one another by using the identification information (hash values). When the game program is created, a table representing Japanese texts extracted from the main program 34 and the identification information (hash values) obtained by hashing the extracted Japanese texts by MD5 is prepared in advance, and the corresponding English texts (and texts translated into the other foreign languages) are sequentially written to the table, thereby providing multilingualization of the game program.

In FIG. 1, the language setting section 40 makes the display section 24 display a language setting screen during the execution of the game, and reads the text data corresponding to the language selected by the player, to make the display section 24 display and output the game screen in the selected language.

The hashing section 42 hashes Japanese texts to be displayed, which is described in the main program 34, by the same function (for example, MD5) as the function used for another identification information stored in the language data 36. Here, the serialized language data 36 is stored in the memory device 30 of the portable terminal, in a data structure in which a pair of a key (hash value of the Japanese data) and a value (translated text) referred to as "HashMap" are held. With such a structure, the data can be retrieved at high speed using the hash value.

The text extracting section 44 retrieves the corresponding text data from the language data corresponding to the language selected by the player, using the hash value obtained by the hashing section 42 as a key, and thereby extracts the texts to be displayed in the foreign language corresponding to the Japanese texts.

Figure 6:
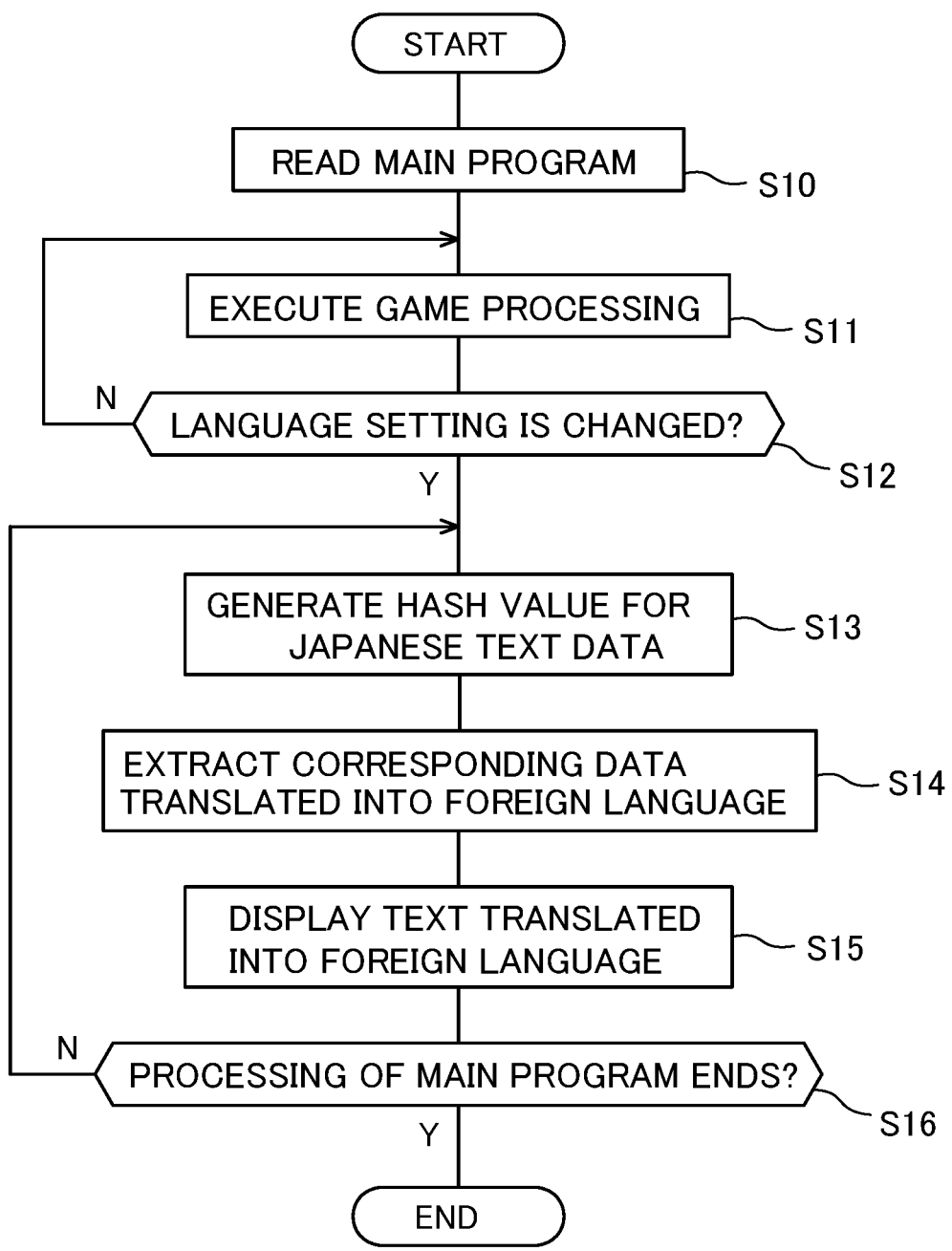
FIG. 6 is a flowchart illustrating an example of a sequence of a game program.
Figure 7:
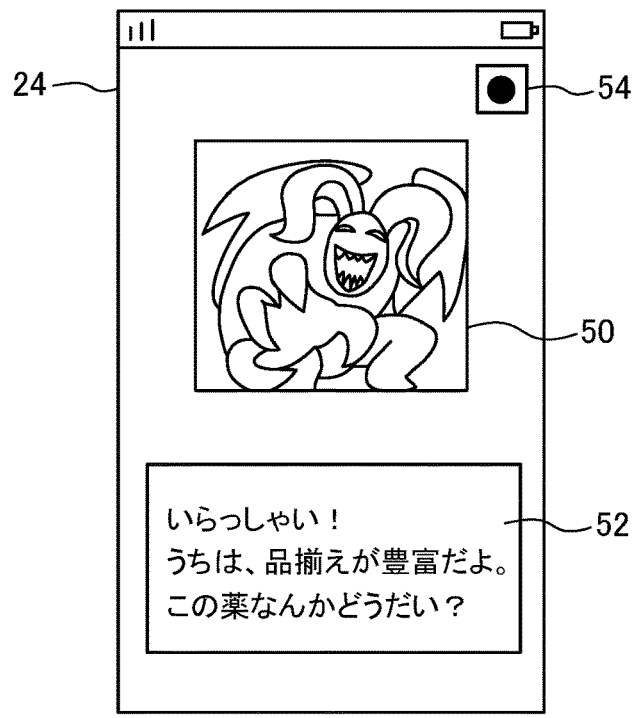
FIG. 7 is a diagram illustrating an example of a display screen of a game.

Hereafter, a process flow for setting the language in the game program of the present embodiment will be described with reference to a flowchart of FIG. 6. When the game program is executed on the portable terminal 10, the main program 34 is read (step S10), game processing is executed according to the program described in the main program 34, and the game progresses (step S11). FIG. 7 is a diagram illustrating an example of a display screen of the game. An image 50 of the character, the texts 52, and an icon 54 for displaying a setting screen are displayed on the display section 24.

Figure 8:
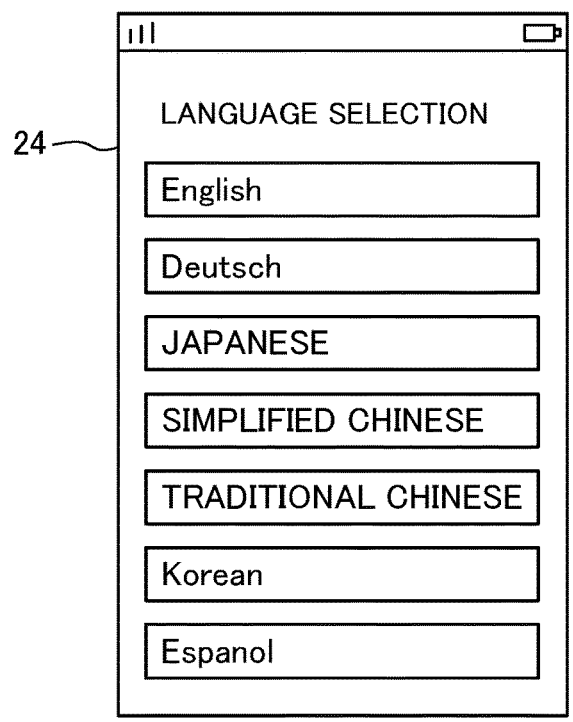
FIG. 8 is a diagram illustrating a language setting screen.

When a player taps the icon 54 on the screen of FIG. 7 to instruct to set the language, the language setting section 40 performs processing for displaying the language setting screen, and the language setting screen illustrated in FIG. 8 is displayed on the display section 24. When the player selects a desired language (for example, an "English" tab) on the screen ("y" in step S12), the hashing section 42 hashes Japanese texts described in the main program 34 by MD5 (step S13) corresponding to the Japanese texts currently displayed on the display section 24 (in the example of FIG. 7, the Japanese texts "Irasshai! Uchi wa shinazoroe ga houfudayo. Kono kusuri nanka doudai?" ("Welcome! We have many goods. How about this medicine?")).

The text extracting section 44 extracts the data (data of English texts) corresponding to the identification information (hash value) from the language data (here, English data 36a) corresponding to the selected language, using the hashed Japanese text data as a key (step S14). The control section 20 replaces the Japanese texts with the extracted English texts to display the English texts on the display section 24 (step S15).

Figure 9:
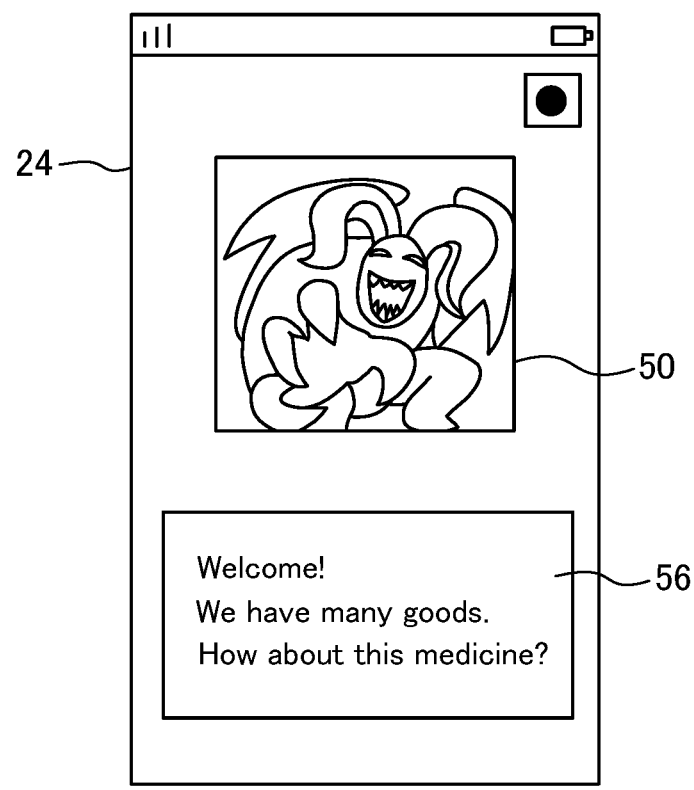
FIG. 9 is a diagram illustrating an example of the display screen of the game.

FIG. 9 is a diagram illustrating an example of a display screen of a game after the language setting is changed to English. On the display section 24, not the Japanese texts (see FIG. 7) but the corresponding English texts (in the example of FIG. 9, "Welcome! We have many goods. How about this medicine?") extracted from the English data 36a are displayed.

It is preferable that when the texts are displayed in a different language, the display section 24 not only simply displays the texts translated into such a language, but also displays the texts in a format (for example, line break and kerning) adjusted to be suitable for the language. When the texts are displayed in Japanese, for example, half size spaces are deleted and full size spaces are left. When the texts are displayed in English, the full size spaces are deleted and the half size spaces are left.

The control section 20 makes the game progress according to the main program 34 that describes the Japanese texts even after the language setting is changed, but performs the processing similar to the processing described above to display the texts in the set language. That is, the Japanese texts in the main program 34 to be next executed are hashed, the corresponding English data (data translated into a foreign language) is extracted using the identification information (hash value) as a key, the Japanese texts are replaced with the English texts, and the English texts are displayed. Then, when the processing by the main program 34 ends ("y" in step S16), the processing of the game program ends.

Note that when the text data translated into the foreign language corresponding to the generated hash value is not extracted, the Japanese texts (or texts translated into another language corresponding to the hash value) may be displayed on the display section 24.

Thus, while the main program that describes the Japanese texts is executed even when the language to be displayed is changed, the corresponding data translated into the changed foreign language is read using the identification information (hash value) of the Japanese data in such a main program as a key, so that the read data is displayed on and output to the display section 24. Therefore, this enables multilingual game to be provided without correcting the contents of the main program to a foreign language (or without preparing a plurality of main programs for each language).

Since not the identification information but the Japanese texts are described in the main program as the text data to be displayed, the program can be developed with reference to the Japanese texts in the main program. Therefore, the program can be efficiently developed without sequentially referring to the texts to be displayed corresponding to the identification information.

It is also possible that the text data (dictionary file) is prepared for each language in advance, and the identification information of the text data in the dictionary file is described in the program data for game progression (for example, a file written in a Lua programming language). In this case, for program progression, the corresponding language text is extracted from the dictionary file using the identification information as a key, so that the appropriate language is output and displayed. According to this configuration, it is not necessary to directly edit the program data for game progression, and therefore the correction work can be efficiently performed. However, the texts to be displayed during the progression of the game are not included in the program data for game progression, so during the development, it is necessary to refer to the texts to be displayed that are stored in another file.

Figure 10:
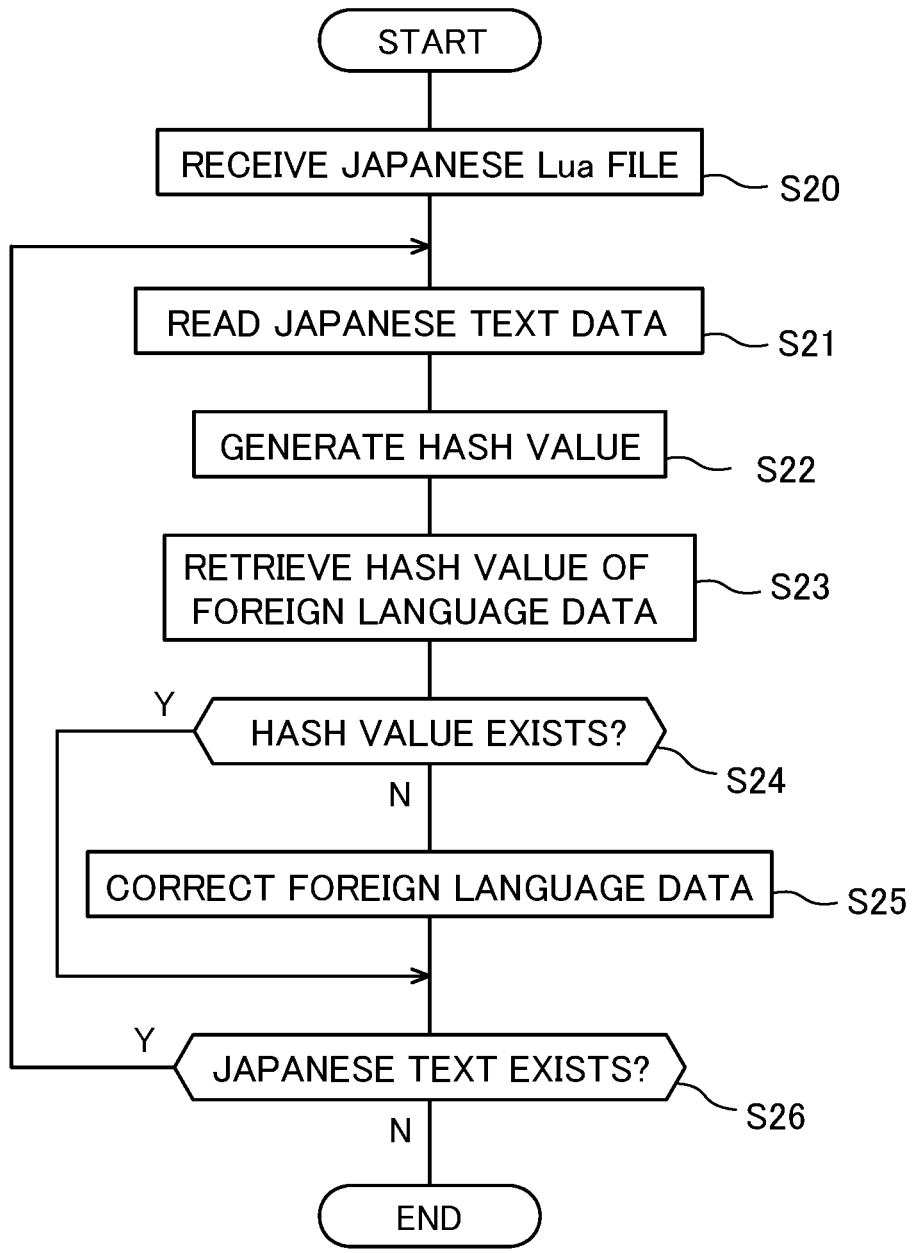
FIG. 10 is a flowchart illustrating an example of a check flow of the text data.

In the above-described embodiment, the operation of the portable terminal on which the game program is installed is described as an example, but the present invention is not limited thereto, and can be applied to check of the text change in the game program development. FIG. 10 is a flowchart illustrating an example of the process procedure. For example, after the main program that describes the Japanese texts is read into a computer for developing the game (step S20), the Japanese text data is read (step S21). The read text data is hashed by MD5, for example (step S22), and the identification information (hash value) included in the data translated into the foreign language in the language data 36 is retrieved using the obtained hash value as a key (step S23).

As a result of retrieval, when the same data as the hash value as a key is included in the data translated in foreign languages, it is determined that the Japanese texts in the main program is not changed, and the process proceeds to step S26. On the other hand, when the corresponding hash value is not included in the data translated into the foreign language, it is determined that the changes are made to the Japanese text (or Japanese texts are newly added), the texts translated into the foreign language are corrected or added by a developer (step S25). It is determined whether Japanese texts to be checked exist in the main program (step S26). If Yes, the process returns to step S21 and the above-described processes are repeated. If No, the process ends.

In the above-described embodiment, a case where all of the processes for multilingual display are performed on the program downloaded to the portable terminal is described, but a part of or all or the processes may be performed on the server side. For example, a configuration may be adopted in which the language data is stored in the server, and the hash value obtained by the portable terminal is transmitted to the server, so that the server extracts the corresponding language to transmit the corresponding language data to the portable terminal. Alternatively, a configuration may be adopted in which the language data is stored in the server, and the portable terminal transmits the Japanese text data to the server, so that the server hashes the received data and extracts the language corresponding to the hash value to transmit the corresponding language data to the portable terminal.

In the above-described embodiment, a case where the texts to be displayed in Japanese are described in the main program is described, but the reference language is not limited to Japanese, and the texts to be displayed in a language (for example, English, or Korean) other than Japanese may be stored in the main program. In such a case, similarly to the above, the texts to be displayed in the language other than Japanese can be extracted using the hash value for the texts to be displayed as a key, thereby capable of providing the multilingualization.

In the above-described embodiment, a case where the multilingualization is provided for the text data included in the game program, but the present invention is not limited to the multilingualization of the texts, and the multilingualization can be also similarly applied to the image including the texts. In this case, the image data including the Japanese texts is included in the main program, and when the image is displayed in another foreign language, the image data including the Japanese texts is hashed, and is replaced with the image data including texts translated into the foreign language using the hash value as a key, thereby capable of displaying the image described in the foreign language.

In some countries (regions) in which the game is executed, the text data cannot be displayed as is in some cases because the representations are regarded as violent. In such a case, the text data in the representations allowed in such countries (regions) is stored not as the Japanese translation but as the data translated into the foreign language, thereby capable of providing the multilingualization in accordance with the characteristics of countries in which the game is played.

The present invention is not limited to the multilingualization of the texts, and the multilingualization can be similarly applied to the still image and the moving image that are changed according to the countries in which the game is played. For example, in some countries (regions) in which the game is executed, the image of the character to be displayed and the character's movements cannot be displayed as is in some cases for a religious reason, based on the preference of the player in the country (region), and because of violent representations. In such a case, as in the above-described case where the texts are displayed, the data (reference data) of the still image and the moving image is included in the main program, the file in which the data of the still image and the moving image is associated with the identification information (hash value) is prepared in advance, and the image and moving image for another country are extracted according to the country in which the game is played using the hash value as a key, to be displayed by being switched as appropriate, thereby capable of providing the display mode in accordance with the characteristics of countries in which the game is played.

The previous description of embodiments is provided to enable any person having ordinary knowledge in the technical field to which the present invention belongs to practice the present invention. Moreover, various modifications to the above-described embodiments will be readily apparent to those skilled in the art, and the generic principles and specific examples defined herein may be applied to other embodiments. The present invention is not intended to be limited to the embodiments described herein but is to be accorded the widest scope as defined by limitation of the claims.

What is claimed is:

1. A non-transitory computer readable recording medium having stored thereon instructions to be executed on a computer for providing a game, said computer having a display section, the recording medium comprising:
   a main program described with a first data to be displayed in a first language; and
   language data in which a second data to be displayed in a second language is associated with identification information, the second language being different from the first language;
   the instructions, when executed, causing the computer to perform the steps of:
   setting a language to be displayed on the display section;
   generating a retrieval key by performing data processing on the first data to be displayed that is included in the main program when the second language is set as a language to be displayed; and
   extracting the second data to be displayed and the identification information, wherein each of the second data to be displayed and the identification information correspond to the generated key, replacing the first data to be displayed with the second data to be displayed to display the second data to be displayed on the display section;
   the non-transitory computer readable recording medium further comprising a region display data in which a third data to be displayed according to a region where the game is executed is associated with the identification information, and
   wherein the instructions, when executed, further cause the computer to perform the steps of:
   determining that the third data to be displayed exists;
   after determining that the third data to be displayed exists, retrieving the third data to be displayed, ending display of the second data to be displayed on the display section, and subsequently beginning display of the third data to be displayed on the display section.

2. The non-transitory computer-readable recording medium according to claim 1, wherein replacing the first data to be displayed with the second data to be displayed to display the second data to be displayed on the display section further comprises:
   retrieving predetermined formatting information associated with the second data to be displayed, and automatically formatting the second data to be displayed according to the predetermined formatting information upon provision of the second data to be displayed in an interface element.

3. The non-transitory computer readable recording medium according to claim 1, wherein the first data to be displayed and the second data to be displayed are text data.

4. The non-transitory computer readable recording medium according to claim 1, wherein the first data to be displayed and the second data to be displayed are image data including a text.

5. The non-transitory computer readable recording medium according to claim 1, wherein the data processing is hashing.

6. The non-transitory computer readable recording medium according to claim 1, wherein the recording medium further comprises instructions configured to cause the computer to display and output the first data to be displayed in a case where the second data to be displayed does not exist.

7. The non-transitory computer readable recording medium according to claim 1, wherein the language data is configured such that the second data to be displayed and the identification information are serialized.

8. The non-transitory computer readable recording medium according to claim 1, wherein, based on a determination that the second language has been set as a language to be displayed, the language data is downloaded to the computer.

9. The non-transitory computer readable recording medium according to claim 1,
wherein generating the retrieval key when the second language is set as the language to be displayed further comprises, prior to performing data processing on the first data to be displayed that is included in the main program, reading and extracting the first data to be displayed from the main program.

10. The non-transitory computer readable recording medium according to claim 1, wherein the first data to be displayed comprises image data including text, and wherein the second data to be displayed comprises image data different from the image data of the first data to be displayed and includes text.

11. A computer control method for a computer having a display section, the computer comprising a main program described with a first data to be displayed in a first language, language data in which a second data to be displayed in a second language is associated with identification information, the second language being different from the first language, and a region display data in which a third data to be displayed according to a region where the game is executed is associated with the identification information, wherein the computer control method comprises performing, on the computer having the display section, the steps of:
setting a language to be displayed on the display section;
generating a retrieval key by performing data processing on the first data to be displayed that is included in the main program when the second language is set as a language to be displayed;
extracting the second data to be displayed and the identification information, wherein each of the second data to be displayed and the identification information correspond to the generated key, replacing the first data to be displayed with the second data to be displayed to display the second data to be displayed on the display section;
determining that the third data to be displayed exists; and
after determining that the third data to be displayed exists, retrieving the third data to be displayed, ending display of the second data to be displayed on the display section, and subsequently beginning display of the third data to be displayed on the display section.

12. The computer control method of claim 11, wherein replacing the first data to be displayed with the second data to be displayed to display the second data to be displayed on the display section further comprises:
retrieving predetermined formatting information associated with the second data to be displayed, and automatically formatting the second data to be displayed according to the predetermined formatting information upon provision of the second data to be displayed in an interface element.

13. The computer control method of claim 11, wherein the first data to be displayed and the second data to be displayed are each selected from at least one of: text data and image data including a text.

14. The computer control method of claim 11, wherein the language data is configured such that the second data to be displayed and the identification information are serialized, and wherein the data processing is hashing.

15. The computer control method of claim 11, further comprising a step of:
based on a determination that the second language has been set as the language to be displayed, downloading the language data to the computer.

16. A computer provided with a display section, the computer performing game progression, the computer comprising:
a main program described with a first data to be displayed in a first language;
language data in which a second data to be displayed in a second language is associated with identification information, the second language being different from the first language;
region display data in which a third data to be displayed according to a region where the game is executed is associated with the identification information; and
a processor configured to execute a control function, said control function comprising:
setting a language to be displayed on the display section;
generating a retrieval key by performing data processing on the first data to be displayed that is included in the main program when the second language is set as a language to be displayed;
extracting the second data to be displayed and the identification information, wherein each of the second data to be displayed and the identification information correspond to the generated key, replacing the first data to be displayed with the second data to be displayed to display the second data to be displayed on the display section;
determining that the third data to be displayed exists; and
after determining that the third data to be displayed exists, retrieving the third data to be displayed, ending display of the second data to be displayed on the display section, and subsequently beginning display of the third data to be displayed on the display section.

17. The computer of claim 16, wherein replacing the first data to be displayed with the second data to be displayed to display the second data to be displayed on the display section further comprises:
retrieving predetermined formatting information associated with the second data to be displayed, and automatically formatting the second data to be displayed according to the predetermined formatting information upon provision of the second data to be displayed in an interface element.

18. The computer of claim 16, wherein the first data to be displayed and the second data to be displayed are each selected from at least one of: text data and image data including a text.

19. The computer of claim 16, wherein the language data is configured such that the second data to be displayed and the identification information are serialized, and wherein the data processing is hashing.

20. The computer of claim 16, wherein the control function further comprises:
based on a determination that the second language has been set as the language to be displayed, downloading the language data to the computer.

* * * * *